March 18, 1947.　　H. T. JEFFERY　　2,417,688
SEWAGE CLARIFIER
Filed Sept. 30, 1943　　5 Sheets-Sheet 1

Fig.1

Inventor:
Harold T. Jeffery,
By Soans, Pond & Anderson
Attorneys.

March 18, 1947. H. T. JEFFERY 2,417,688
SEWAGE CLARIFIER
Filed Sept. 30, 1943 5 Sheets-Sheet 2

March 18, 1947.  H. T. JEFFERY  2,417,688
SEWAGE CLARIFIER
Filed Sept. 30, 1943  5 Sheets-Sheet 3

Inventor:
Harold T. Jeffery,
By Soans, Pond & Anderson
Attorneys.

March 18, 1947. H. T. JEFFERY 2,417,688
SEWAGE CLARIFIER
Filed Sept. 30, 1943 5 Sheets-Sheet 5

Inventor:
Harold T. Jeffery,
By Soans, Pond
and Anderson
Attorneys

Patented Mar. 18, 1947

2,417,688

UNITED STATES PATENT OFFICE 2,417,688

SEWAGE CLARIFIER

Harold T. Jeffery, Wilmette, Ill., assignor to Yeomans Brothers Company, a corporation of Delaware Application September 30, 1943, Serial No. 504,342

8 Claims. (Cl. 210—55)

This invention relates to clarifiers such as are used for removing solid or heavy matter from water, sewage, etc., by sedimentation. The apparatus herein contemplated is of the type wherein the liquid to be clarified is delivered to a large tank, usually constructed of concrete, and in which tank the liquid is retained in a quiescent condition to facilitate the settlement of the solid matter to the bottom of the tank. The apparatus also usually includes some forms of apparatus for scraping the bottom of the tank to propel the sediment to an outlet, which conducts the sediment to any selected place or apparatus for disposal or further treatment.

Devices of the character indicated, as heretofore constructed, usually embody some form of rotary bottom scraper mounted for rotation on tracks on the upper edge of the side wall of the tank, or on a central pivot supported by an upwardly extending pier disposed in the center of the tank. Most of these structures also embody some form of bridge structure, extending from the side wall of the tank to the central pier, such bridge structure being employed to afford access to centrally located mechanism for effecting rotary movement of the scraper structure, and sometimes for supporting the scraper structure. The prior art constructions have involved great expense incident to the provision of the aforementioned bridge structures, incident to the driving of the rotary scraper at its center of rotation, and the construction of central piers which have been required in many cases, as already indicated.

The main objects of the present invention are to provide a clarifier structure of simplified, less costly, design, but which will, nevertheless, be as effective and efficient as the more complicated and expensive structures heretofore available; to provide a structure in which rotary movement of the bottom scraper may be effected at a uniform and steady pace, and by the application of considerably less power than has usually been required for performing equivalent work in prior art devices; and to provide a clarifier structure in which centering of the rotary scraping mechanism relative to the tank may be easily and economically effected.

Other objects of the invention are to provide an improved arrangement for delivering the incoming sewage or liquid to the tank with a minimum agitation of the liquid already in the tank; to provide improved means for protecting the power unit which drives the scraper structure, against damage incident to overloading, which sometimes occurs by reason of jamming of the scraper structure; to provide a simplified, but efficient, arrangement for removing scum from the surface of the liquid in the tank; and to provide apparatus of the character indicated which may have its main features embodied in a construction either with or without a central supporting pier, and in which the need for the conventional bridge structure is entirely eliminated.

Other objects and advantages of the invention will appear in the following specification, and accompanying drawings, wherein there is described and illustrated clarifying apparatus of the character indicated, and embodying a selected form of the invention.

The clarifier structure herein illustrated is designed particularly for the clarification of raw sewage, this being usually the first step in the various methods of sewage treatment now employed. It will, however, be understood that the principles of the structure illustrated are adaptable for clarifiers for removing solid matter or silt from river water, and like purposes.

Figure 2:
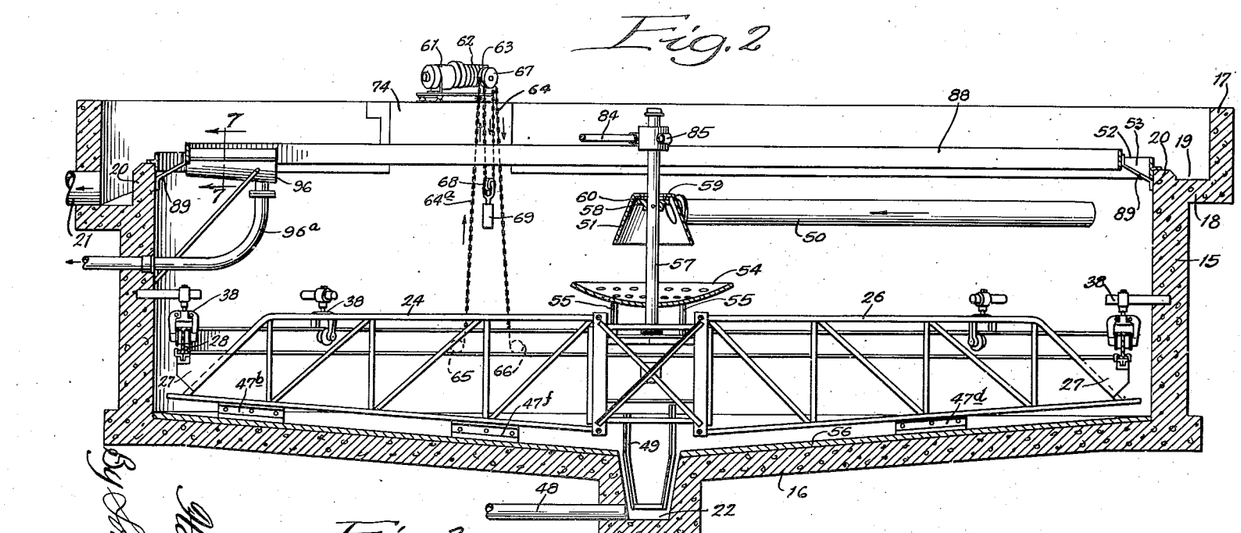
Fig. 2 is a section on the line 2—2 of Fig. 1.

The structure herein illustrated embodies a suitable concrete settling tank having a substantially cylindrical side wall 15, a slightly conical, or dished, bottom wall 16, and an outwardly off-set cylindrical upper wall portion 17. The wall portion 15 is connected to the outwardly off-set portion 17 by a laterally extending portion 18, which forms the bottom of an outlet, or effluent trough 19. The trough 19 is formed, in part, by an upward extension 20 of the wall 15. As indicated in Fig. 2, the trough bottom forming portion 18 inclines from a high point diametrically opposite an outlet 21 to a low point at said outlet. The upper end of the wall part 20 is substantially level, or horizontal.

The rotary scraper device for scaping the bottom of the tank, and for propelling the sediment to a well 22 in the center of the tank consists, in this instance, of a four-armed structure. The arms of the scraper structure may advantageously be formed of metal tubing, or even of wood. Each arm is constructed in the form of a suitable truss which is resistant to both vertical and horizontal flexing, and the four arms are rigidly interconnected where their inner ends contact one another. It will be seen that the inner ends of the four arms which are respectively designated 23, 24, 25 and 26 come together to form a more or less square central frame, or box.

Figure 3:
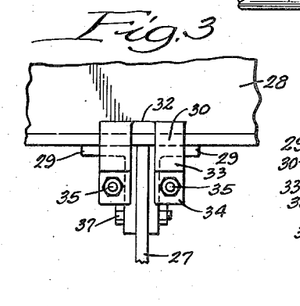
Figs. 3, 4 and 5 are illustrations of certain details appearing in Fig. 2, but on an enlarged scale.
Figure 4:
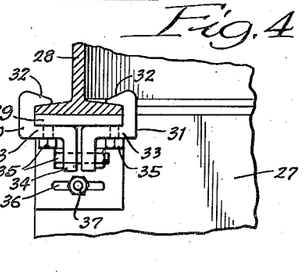

The outer end of each of the arms is provided with an outwardly extending bracket structure 27, on which is mounted a circular I-beam 28. The I-beam 28 may, of course consist of a number of sections suitably secured in end to end relationship, to form the continuous annulus. The said annulus is suitably mounted on the supporting brackets 27 by means of clamping bolts, or otherwise, and preferably in such a manner that the annular I-beam is adjustable laterally relative to the axis of the four-armed scraper structure. The details of the mounting of the I-beam on the supporting brackets may be greatly varied. For example, the mounting may advantageously be such as shown in Figs. 3 and 4. As they are shown, the annular I-beam 28 is clamped to laterally extending, horizontal ears of angle members 29, which are mounted on the bracket plates 27 for lateral movement inwardly and outwardly of the scraper arms 23 to 26 inclusive. The clamping is effected by means of a pair of clamping units 30 and 31, which have upper end portions 32 overlying the bottom flange of the annular I-beam, portions 33 underlaying the bracket ears 29, and depending portions 34, through which bolts 35 extend for clamping the portions 30 and 31 tightly against the inner and outer edges of the I-beam flanges, and against the inner and outer edges of the bracket ears 29. The ear brackets 29 may be provided with one or more slots, such as indicated at 36, for cooperating with the clamping bolt such as 37, to adjustably mount the ear brackets on the plates 27, as aforesaid. Additional clamping and locking screws 35 may be provided for applying vertical pressure to the connected parts 28 and 29, thereby to make the connection more secure.

It will be seen that the clamping connection described permits relative adjustment of the annular I-beam 28, and the supporting brackets 27, substantially without restriction as to the direction of adjustment.

Figure 5:
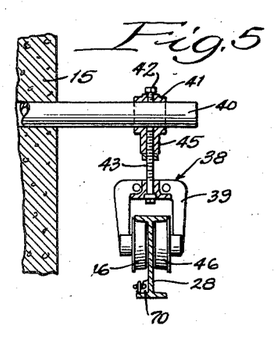
Figure 6:
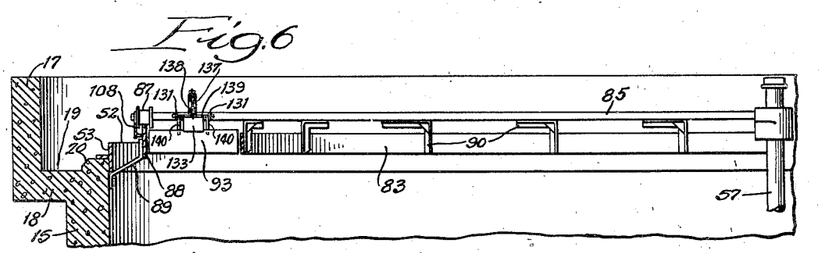
Fig. 6 is a section on the line 6—6 of Fig. 1.

The scraper structure, with its annular I-beam 28, is supported by means of suitable hangers, such as indicated at 38, the details of which are best shown in Fig. 5. As there shown, each hanger 38 comprises a fork or clevis 39, vertically adjustably suspended from a post 40, which is suitably mounted in the side wall 15 of the tank. The post 40 is a rigid post, preferably a round tube or bar. A fitting 41 is slidable lengthwise of the bar 40, and is adapted to be clamped in place by a set screw 42 threaded through the upper portion of the fitting 41. A bolt 43, equipped with an enlarged head end has the clevis 39 supported by said enlarged end, and the bolt 43 is threaded into a depending extension 45 of the fitting 41. By adjusting the bolt 43 inwardly or outwardly of the fitting 41, the clevis 39 will be raised or lowered. A lock nut may be employed on the bolt 43, as indicated, for locking the same in selected position of adjustment. The lower ends of the clevis 39 have rotatably mounted therein, suitable rollers 46 which engage the underside of the top flanges of the I-beam member 28.

Figure 1:
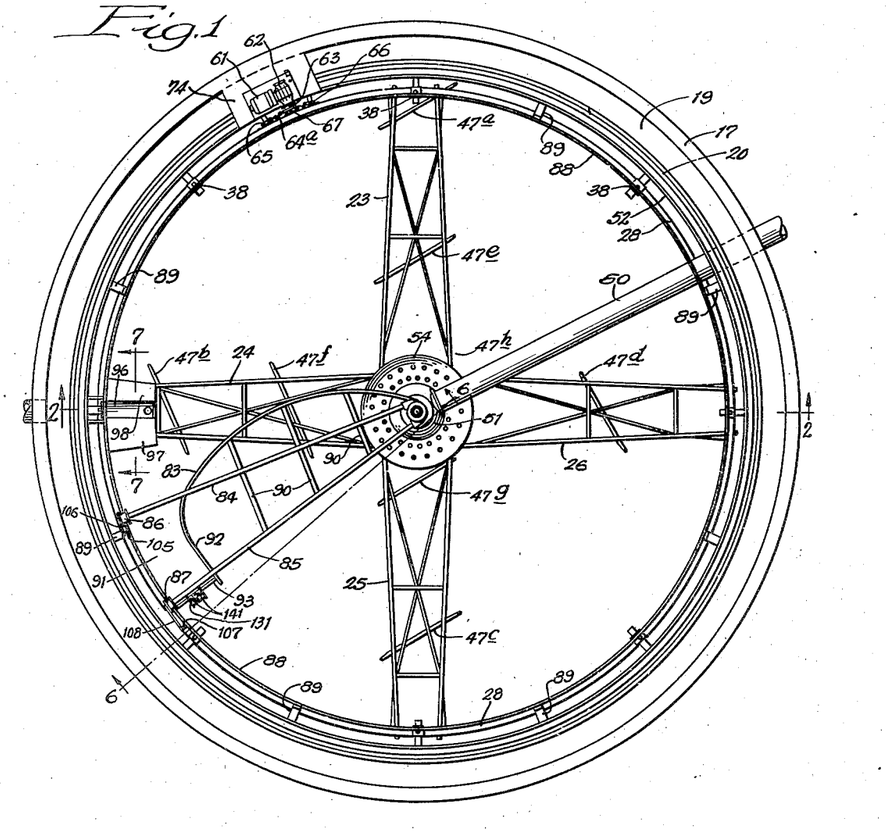
Fig. 1 is a plan.

As shown in Fig. 1, the supporting hangers 38 are provided at suitable intervals around the wall of the tank, and it will be seen that the annular I-beam is movably and adjustably supported by said hangers.

Each of the scraper arms 23, 24, 25 and 26 carries one or more scraping blades 47. The scraping blades 47 are arranged at an angle, as best shown in Fig. 1, so that they will be effective upon rotary travel with their respective supporting arms, to propel or flow sediment on the bottom of the tank towards the central well 22. Although various arrangements of scrapers or plows may be employed, I prefer to employ an arrangement in which scraper 47a, on the outer end of the arm 23, effects initial movement of sediment inwardly from the adjacent side wall of the tank. A scraper 47b on the arm 24, is positioned to pick up the sediment where it is left by the scraper 47a, and to effect further inward movement thereof, together with additional sediment deposited on the bottom of the tank in the path of the scraper 47b. Scrapers 47c, 47d, 47e, 47f, 47g and 47h, carried respectively on the arms 25, 26, 23, 24, 25 and 23, serve to effect successive stages of inward movement of the sediment, the scraper 47h delivering the sediment to the well 22, from which it is removed through a suitable outlet 48.

To prevent sediment from clinging to the side walls and the bottom of the well 22, an auxiliary scraping structure 49 is secured to, and depends from, the central portion of the arm structure, as best shown in Fig. 2. The bottom 16 of the tank 15 is preferably finished with a relatively thin layer 56 of grout which may be run in by rotation of the scraper structure, thereby insuring proper inter-engagement of the scrapers and the bottom of the tank.

The liquid such as raw sewage to be clarified in the tank, may be delivered thereto through a conduit, or influent 50, which extends through the side wall of the tank, and to the center thereof. At its center end, the influent 50 is preferably provided with a truncated cone-like terminal fitting 51, which directs the incoming sewage downwardly, and also serves to prevent the formation of horizontal currents, or turbulence, in the liquid contained in the tank. It will be understood that the terminal fitting 51 of the influent, and the influent 50, are normally located below the level of the liquid in the tank. Said level is normally determined by the upper edge 52 of a weir plate 53, which is secured to, and extends upwardly from the upper end of the side wall portion 20, to thereby deepen the trough 19.

The sewage or other liquid delivered to the tank through the influent 50, is directed downwardly against a dished diffusion shield 54, which is supported by suitable standards 55, extending upwardly from the central connecting members of the scraper arm structure. The shield 54 is perforated so that most of the solid matter contained in the liquid delivered thereto, will be permitted to pass through the shield in a downward direction. The liquid and lighter portions of the solid matter, will be sprayed laterally in a more or less radial fashion from the periphery of the shield 54, so that there is formed no fast-moving stream of liquid, which would serve to prevent rapid settling of solid matter in the tank.

The inner end of the influent 50 may effectively be supported by means of a post, or mast 57, which extends upwardly from the central portion of the scraper arm structure, and is rigidly connected thereto so as to rotate therewith. Said mast may have a flange 58 pinned thereto, and said flange is adapted to support the inner end of the influent 50, by engagement with the top wall 59 of the terminal fitting 51. A suitable anti-friction bearing ring 60 may advantageously be interposed between the supporting flange 58, and the top wall 59 of the terminal fitting.

Figure 10:
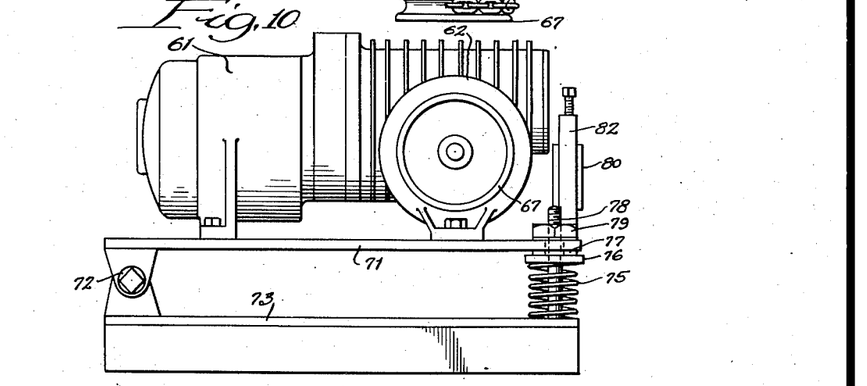

The rotatably supported scraper structure is driven by means of an electric motor 61, which acts through a worm and worm wheel speed reducing unit 62 to drive a sprocket wheel 63, which is keyed to the output shaft of the speed reducing unit 62. A suitable chain 64 meshes with the driving sprocket 63, so that upon rotation of the sprocket 63 in a clockwise direction, as viewed in Figs. 2 and 10, the reach 64a of the chain will be pulled upwardly. The reach 64a of the chain extends from the sprocket 63 downwardly around a suitable guide wheel, or pulley 65, which is rotatably mounted on a suitable shaft projecting from the inside of the tank wall 15 (see Figs. 1 and 2). The chain extends under the guide wheel 65 and then around the outside of the annular I-beam 28, then under another guide wheel 66 mounted on the tank wall, upwardly from said guide wheel 66, and around an idler guide wheel 67, which is rotatably mounted on an extension of the shaft on which the sprocket wheel 63 is keyed. The chain extends over the idler wheel 67 downwardly, and around a free-hanging pulley 68, which is weighted, as shown at 69, and thence upwardly to the sprocket 63. It will be seen that rotation of the sprocket 63 in a clockwise direction will cause the reach 64a of the chain to be pulled upwardly. At suitably spaced points around the circumference of the annular I-beam 28, there are provided suitably slotted brackets 70 (see Fig 5) which lock the chain to the I-beam against relative movement, so that the movement imparted to the chain by the driven sprocket 63 will be imparted to the annular I-beam, and the rotary scraper structure, to which the annular I-beam is secured.

The chain loop resulting from the use of the weighted pulley 68 and said weighted pulley, serve to maintain the active portions of the chain in a desirable taut condition at all times, notwithstanding changes in the length of the chain, due to stretching wear, changes in temperature, and other causes.

The driving motor 61, and the speed reducing mechanism 62 are mounted on a plate 71, which is pivotally or hingeably mounted at one end, as indicated at 72, on a bed plate 73, which is, in turn, suitably anchored on the top edge of an extension 74 (Fig. 2) of the wall part 20. As best indicated in Fig. 2, said extension 74 is extended laterally outwardly adjacent its upper end to join the wall portion 17, so as to bridge the channel 19. The other part of the supporting plate 71 is resiliently supported by means of a suitable compression spring 75, which is interposed between the base plate 73 and the plate 71. The spring 75 may have its upward expansion limited by suitable means for limiting upward movement of the free end of the platform 71. For example, there may be provided a bolt 78 anchored in base plate 73, extending upwardly through an opening in the platform 71, and provided with an adjustable stop nut 79.

Figure 11:
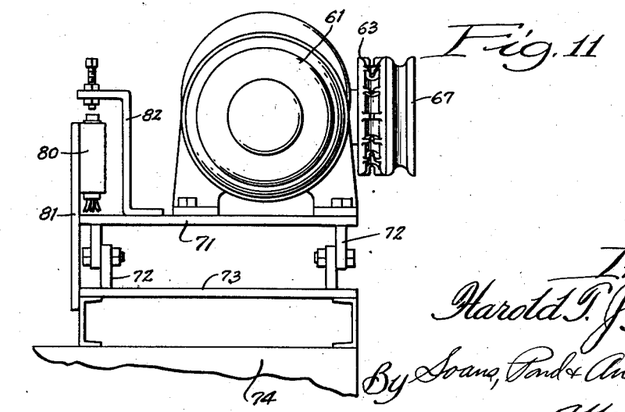

The described mounting of the driving unit permits the sprocket 63 to move downwardly a short distance in the event that rotation of the scraper structure is stopped by some foreign object, or in any manner whatever. It will be seen that if the rotary scraper structure is held against rotation, the reach 64a of the chain will be held against upward movement, with the result that the driven sprocket 63 will travel downwardly along said reach of the chain. An electric switch 80, incorporated in the electric circuit of the driving motor 61, is adapted to be actuated to open said circuit to thereby stop the motor 61 in the event that any substantial downward movement of the driven sprocket occurs in the manner indicated. As shown best in Fig. 11, such switch 80 may be fixedly mounted on a bracket, or post 81, which extends upwardly from the stationary bed plate 73. An adjustable switch actuating member 82 is carried by the free end of the hingeably mounted platform 71, so that when said end thereof moves downwardly, the switch will be actuated to break the circuit to the motor to thereby prevent continued operation and overloading of the motor, with possible damage to some part of the apparatus. If desired the switch 80 may also control an electric circuit for energizing audible or visible signal means to call attention to the stoppage of operation. The switch 80 may be a single pole double throw switch so wired to the motor and alarm means as to be capable of instantly stopping the motor and actuating the alarm.

When a settling tank of the character above described is employed as the first step of a sewage treatment plant, it is usually equipped with a so-called skimmer for removing scum which normally floats and collects on the top surface of the liquid in the tank.

A suitable skimmer may consist of a curved metal plate 83, which is supported by means of a suitable frame structure, comprising a pair of approximately radially extending members 84 and 85, the inner ends of which are suitably secured to the rotating mast 57, and the outer ends of which are supported by rollers 86 and 87, which ride on the upper edge of a baffle plate 88. The baffle plate 88 is disposed in inwardly spaced relation to the annular weir plate 53, and extends sufficiently below the liquid level maintained by the weir plate 53, to prevent scum from floating into the effluent channel 19. Said baffle plate 88 is suitably supported from the wall of the structure by brackets, such as indicated at 89. The curved skimmer plate 83 may be supported by direct attachment near its outer end to the arms 84 and 85, by supporting arms 90, which are carried by said arms 84 and 85, and by attachment at its inner end to the rotary mast 57. The skimmer 83, like the baffle plate 88, extends upwardly and downwardly from the normal liquid level in the tank, to prevent the passage of scum either over or under said plate 83. The curvature of the plate 83 is such that a normal rotation of the mast 57, and of the skimmer structure, will cause the surface scum to move outwardly along said skimmer plate 83, and into a box-like area, indicated at 91, formed between a tail piece 92 of the skimmer plate, the baffle plate 88, and pivoted back plate 93. The back plate 93 is pivotally mounted on the supporting arm 85, and is preferably urged by yieldable spring or like means to assume a substantially vertically-disposed position, indicated in Fig. 7.

Figure 7:
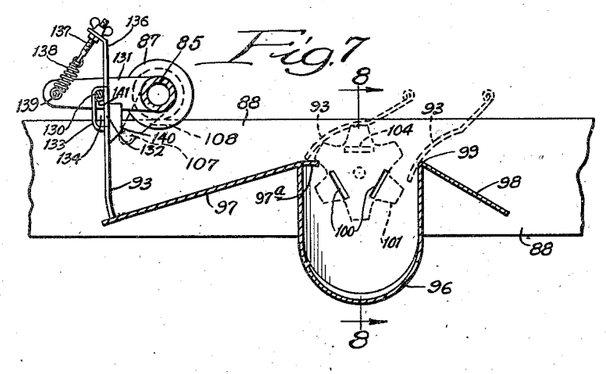
Fig. 7 is a fragmentary section on the plane indicated by the line 7—7 of Figs. 1 and 2.
Figure 8:
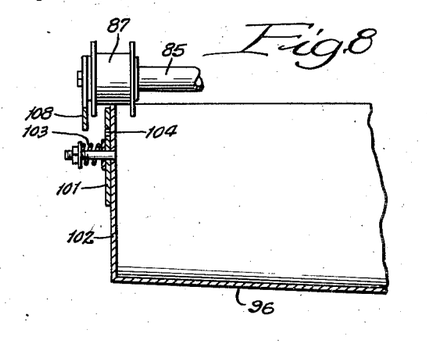
Fig. 8 is a section on the line 8—8 of Fig. 7.
Figure 9:
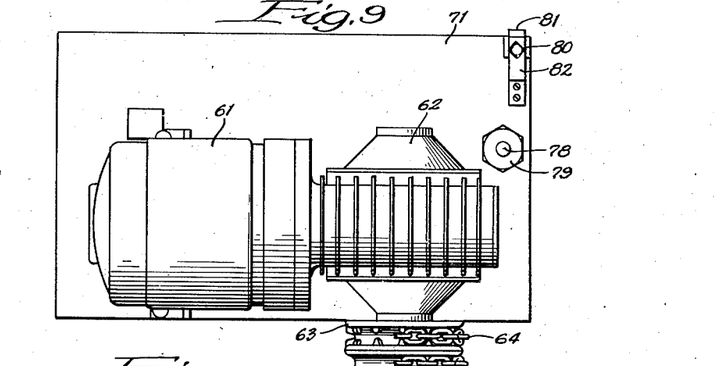
Figs. 9, 10 and 11 are top, side and end elevations respectively of a power unit employed for driving a rotary scraper structure.

The pocket-forming portion and pivoted back plate 93 of the skimmer structure cooperate with a trough structure 96, which extends radially inwardly from the baffle plate 88. The back plate is carried by the skimmer frame in a path of travel which is concentric with the baffle 88. The inner end of the trough 96 is provided with an outlet opening to which a drain pipe 96a is connected. Said trough 96 is equipped with inclined platforms 97 and 98 respectively, and with an inwardly extending ledge 97a. The arrangement is such that when the pivoted plate 93 of the skimmer structure approaches the trough 96, the lower end of the pivoted plate will, as shown in Fig. 7, ride upwardly on the inclined plate 97, and propel any scum in front of it into the trough 96. Incident to the pivot mounting of the back plate 93, said plate is adapted to rock rearwardly on its pivot mounting so as to permit the plate to pass over the inclined plate 97. When the skimmer structure advances to such a position that the pivoted plate 93 leaves the inwardly extending ledge portion 97a, said back plate 93 will be rocked downwardly with a quick or snap action, which will tend to dislodge any sludge which may otherwise cling to the member 93. A further cleaning action is obtained for the member 93 by causing it to drag across the upper edge portion 99 of the trough structure, as indicated in Fig. 7. The inclined plate 98 serves to permit restoration of the back member 93 to its normal vertical position without a quick or snap action which would create some disturbance in the liquid content in the tank.

The back plate 93 is preferably hingedly and vertically movably mounted on a horizontal pivot pin 130 carried by a pair of arms 131 which extend rearwardly from the skimmer frame arm 85. For so mounting the back plate 93 on the pivot rod 130, the back plate 93 has a centrally disposed upward extension 132 which is somewhat narrower than the space between the arms 131, 131. A U-shaped piece 133 corresponding in width to the width of the plate extension 132 has its legs welded or otherwise secured to the plate 93 or its extension 132 to form a vertically extending slot 134 which receives the pivot rod 130. It will be apparent from inspection of Fig. 7 that the back plate 93 is capable of not only pivotal movement about the axis of the rod 130 but also vertical movement relative to said pivot rod. The plate 93 is provided with a further upwardly extending arm portion 136 in which there is adjustably mounted an eye-bolt 137. A spring 138 stretched between said eye-bolt 137 and a rod 139 carried by the outer ends of the arms 131 serves to resiliently maintain the plate 93 in its normal, approximately, vertical position against stop lugs 140 depending from the arms 131 and also yieldingly resists vertical movement of the plate. It will be seen that the described mounting of the plate 93 on the rod 130 permits a limited amount of rocking of the plate in its own vertical plane whereby the bottom edge of the plate 93 is permitted to maintain edge-long contact with the apron 97 during the travel of the plate across that apron. This arrangement permits the use of a simple flat apron 97 instead of one embodying a complex curved formation which would, otherwise, be necessary if the back member 93 were not permitted to rock in its own vertical plane as already explained. A pair of coil springs 141 interposed between the ends of the hinge forming elements 132 and 133 and the respective adjacent arms 131 serves to maintain the hinge forming elements centered between the arms so as to insure free movement of the hinged elements between said arms. The springs 141 are positioned around the pivot rod 130.

For flushing scum out of the trough, or box 96, the outer end thereof is equipped with a pair of angularly disposed openings 100, for permitting relatively clear liquid to flow into the box from between the baffle plate 88 and the weir plate 53. The flow of water into the trough may advantageously be controlled by a rotary valve plate 101, which is suitably pivotally mounted on the outer end wall 102 of the trough, said end wall being formed in part by the baffle plate 88. The rotary valve plate 101 may be held into face to face contact with the end wall 102 by suitable compression spring means indicated at 103, and it is provided, in this instance, with a series of three relatively angularly disposed openings 104. The arrangement of the openings 104 in the valve plate 101 is such that two of the openings are adapted to register with the openings 100 every other time that the valve plate is turned through one-sixth of a rotation. As best shown in Fig. 7, the valve plate is equipped with six equally spaced, radially extending arms. The upwardly extending arm of the valve plate is adapted to be engaged first by a pin 105 carried by an arm 106 extending from the outer end of the frame arm 84. (See Fig. 1.) When the arm 84 passes the trough structure, its pin 105 will be caused to engage the then upwardly extending arm of the valve plate 101, to thereby rotate the same through one-sixth of a rotation, as an incident to the passage of said skimmer frame arm 84, and its valve-operating pin 105. The pin 105 is operative to rock the valve plate to the open position illustrated in Fig. 7, wherein two of the openings 104 in the valve plate, register with the openings 100 in the outer end wall of the trough.

Another valve operating pin 107 is carried by an arm 108, which extends from the outer end of the rear skimmer frame member 85. Said valve operating pin 107 is operative to rotate the value plate another one-sixth of a turn, to thereby move the openings 104 in the valve plate to a non-registering position, relative to the openings 100. When the valve plate is adjusted to open position, a sufficient volume of clear liquid flows into the trough to effectively flush the same. It will be apparent that each time that the skimmer structure passes the trough 96, the valve plate will be turned two steps, one for opening the valve, and another for closing the valve. By this means, the collected scum is not unnecessarily diluted with clear liquid, while at the same time, sufficient clear liquid is supplied to effectively carry away the collected scum.

In some instances, particularly in larger settling tank structures, it is preferred that the influent deliver the incoming liquid from a centrally disposed upwardly discharging influent. The scraper structure, its driving means, and the described skimmer, may be employed in such instances by incorporating the details of the structure illustrated in Figs. 12 and 13.

Figure 13:
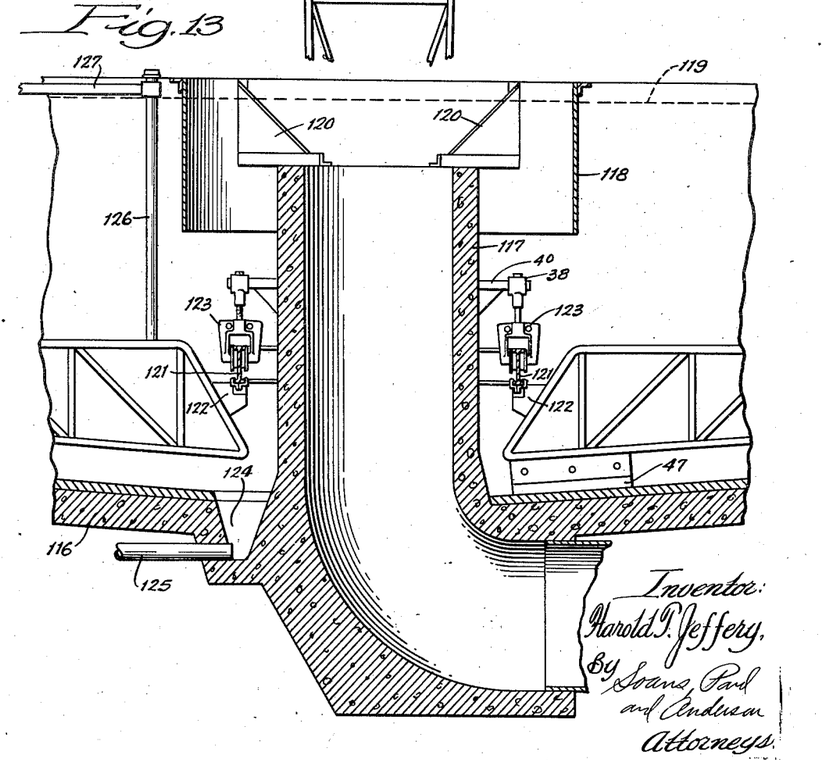
Fig. 13 is a section on the line 13—13 of Fig. 12.

In Fig. 13, the central portion of the bottom of the tank is indicated at 116, and an influent line 117, in the form of a centrally located upwardly extending conduit, is provided, the same being cast integrally with the bottom of the tank, or otherwise suitably formed. For preventing extended radial flow of incoming sewage from the upper end of the influent line 117, there is provided a cylindrical jacket, or casing 118, which surrounds the upper end portion of the influent line 117, and which extends at least a short distance above the normal liquid level, which is indicated at 119. The jacket 118 may be supported by suitable bracket structures, such as indicated at 120, on the upper end of the influent 117.

The four arms of the rotary scraper structure, instead of being directly united in the center of the tank, as in the arrangement above described, terminate short of the upwardly extending central influent line 117, and are interconnected by means of an annular I-beam 121. The I-beam 121 may be connected to shelf or bracket structures, such as indicated at 122, on the inner ends of the arms of the scraper structure. The connections are preferably adjustable, and more or less of the character of the connection described between the peripheral I-beam 28, and the outer ends of the scraper arms. The inner ends of the arms, being rigidly interconnected by means of the central annular I-beam 121, and having their outer ends rigidly interconnected by the peripheral I-beam 28, as already indicated, will rotate as a unit. The inner ends of the arms may be supported for rotation by means of rollers carried by hangers 123, which correspond to the outer supporting hangers 38. A sediment well 124 is provided around a portion of the upwardly extending influent line 117, and may be drained through an outlet pipe 125.

Figure 12:
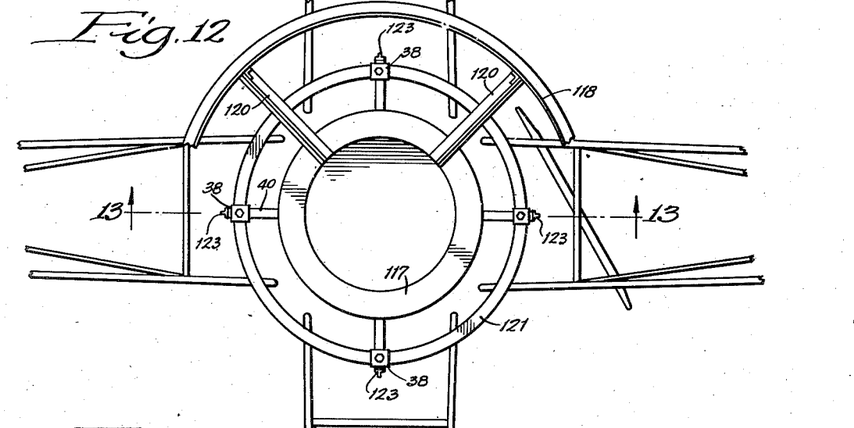
Fig. 12 is a fragmentary plan of a modified construction.

The inner end of a skimmer structure indicated at 127, may be supported in the modified arrangement shown in Figs. 12 and 13, by means of a post, or mast 126, which extends upwardly from the inner end of one of the scraper arm structures.

The described structure facilitates the employment of four scraper supporting arms with double the lineal length of the scraper blades that are usually employed in conventional devices, which usually have but two scraper supporting arms. The described structure is accordingly capable of removing settled sludge in one-half the time, for a given speed of rotation of the scraper structure, that is required by conventional structures. Such accelerated sludge removal is, however, effected without increasing the speed of movement of the sludge along the bottom of the tank, thereby avoiding any tendency to agitate the liquid therein, which would adversely affect the settling process.

The described structure, if intermittently operated, would need to be operated only about one-half the time usually required for a conventional two-arm machine. As an alternate method of operation, the described structure, may be operated at one-half the speed of the conventional two-arm equipment, while performing the same amount of useful work.

The application of driving power to the periphery of the rotary scraping structure, permits the employment of a considerably smaller power unit, with attendant advantages and economies. The peripheral application of driving power also permits the employment of a much lighter scraper structure, since it eliminates the high stresses incident to the application of rotating power at the center of the rotated structure. The facility with which the rotary structure may be centered, relative to the tank, is also an important advantage of the described structure.

The automatic skimming mechanism, and automatically flushed scum box avoids the need for careful attention by an attendant, and permits uninterrupted operation of the structure, even in the absence of an attendant.

Many changes in the described structure may be made while retaining the principles of the invention, as set forth in the following claims.

I claim:

1. Apparatus of the class described comprising a tank having a bottom wall and a side wall, inlet means arranged to conduct a liquid which is to be clarified into the interior of said tank, and to discharge said liquid centrally of said tank in a region which is spaced upwardly from the bottom of said tank outlet means, located adjacent the top of said tank and spaced horizontally from said inlet for conducting clarified liquid from said tank, sediment collecting and discharge means which includes a sediment collecting chamber located on the bottom wall of said tank, a normally submerged, scraper structure, means supporting said scraper structure for rotatable movement within said tank, said scraper structure including a plurality of scraper members for effecting movement of sediment along the bottom of said tank and into said sediment chamber as an incident to the rotation of said scraper structure, means for rotating said scraper structure comprising a normally stationary, electrically driven power unit embodying a driven sprocket disposed adjacent the top of said tank, an endless chain which engages said sprocket so as to be driven thereby and which extends downwardly from said sprocket to the level of said scraper structure and thence around said structure, and means for guiding said chain from the downwardly extending reaches thereof to and about said scraper structure, yieldable means supporting said power unit in predetermined operative position, said support means being operable to permit movement of said power unit in the event normal movement of said chain is excessively resisted, switch means for controlling the supply of electric power to said power unit, and means for actuating said switch as an incident to movement of said power unit in the event aforesaid.

2. Apparatus of the class described comprising a tank having a bottom and a side wall, inlet means arranged to conduct a liquid which is to be clarified into the central portion of said tank and to discharge said liquid in a region which is spaced upwardly from the bottom of said tank, outlet means including a circular, overflow weir supported on the top of said side wall for conducting clarified liquid from said tank, sediment collecting and discharge means which includes a sediment collecting chamber located in the bottom wall of said tank, a scraper structure for moving sediment along the bottom of said tank and into said sediment collecting chamber, means supporting said scraper structure for rotation within said tank, means for rotating said scraper structure, a scum baffle spaced inwardly from said overflow weir and substantially concentric therewith, said baffle extended above and below the level of the top of said overflow weir to prevent scum from being discharged with the clarified liquid, a skimmer comprising a plate extending outwardly from adjacent the center of the tank towards said baffle, means supporting said skimmer for rotation about said center, means for rotating said skimmer, including an upwardly extending mast which is attached to said scraper structure and to said skimmer, said skimmer being arranged to cause scum to move outwardly towards said baffle as an incident to the rotation of the skimmer and having a rearwardly extending portion which cooperates with said baffle to form the sides of a pocket for collecting such scum, a back wall for said pocket, a trough extending above and below the level of the top of said overflow weir for receiving the collected scum from said pocket, a ramp extending from below the level of the top of said overflow weir to the top of said trough, said trough and ramp being disposed in the area through which said pocket moves, said back wall being mounted on said skimmer so as to be resiliently displaceable by engagement with said ramp and trough incident to movement of said pocket past said trough, whereby said back wall is operative to propel the scum over said ramp and into said trough, one end of said trough having an opening communicating with the clarified liquid outside of said baffle, valve means for closing said opening, and means for automatically opening and closing said valve each time that the scum is delivered to said trough.

3. Apparatus of the class described comprising a tank having a bottom wall and a side wall, inlet means arranged to conduct a liquid which is to be clarified into the interior of said tank and to discharge said liquid centrally of said tank in a region which is spaced upwardly from the bottom of said tank, outlet means, located adjacent the top of said tank and spaced horizontally from said inlet for conducting clarified liquid from said tank, sediment collecting and discharge means which includes a sediment collecting chamber located in the bottom wall of said tank, a normally submerged, scraper structure, means supporting said scraper structure for rotatable movement within said tank, said scraper structure including a plurality of scraper members which are attached thereto and movable therewith for effecting movement of sediment along the bottom of said tank and into said sediment chamber as an incident to the rotation of said scraper structure, and means for rotating said scraper structure comprising a normally stationary power unit, which embodies a driven sprocket and which is disposed adjacent the top of said tank, an endless chain which engages said sprocket so as to be driven thereby and which extends downwardly from said power unit to the level of said scraper structure and thence around said structure, and means for guiding said chain from the downwardly extending reaches thereof to and about said scraper structure.

4. Apparatus of the class described comprising a tank having a bottom wall and a side wall, inlet means arranged to conduct a liquid which is to be clarified into the interior of said tank and to discharge said liquid centrally of said tank in a region which is spaced upwardly from the bottom of said tank, outlet means, located adjacent the top of said tank and spaced horizontally from said inlet for conducting clarified liquid from said tank, sediment collecting and discharge means which includes a sediment collecting chamber located in the bottom wall of said tank, a normally submerged, scraper structure, means supporting said scraper structure for rotatable movement within said tank, said scraper structure including a plurality of scraper members attached thereto and movable therewith for effecting movement of sediment along the bottom of said tank and into said sediment chamber, as an incident to the rotation of said structure, and a circular structural member which extends peripherally of said structure and which is mechanically connected to said structure and to said scraper members, and means for rotating said scraper structure comprising a normally stationary power unit, which embodies a driven sprocket and which is disposed adjacent the top of said tank, an endless chain which engages said sprocket so as to be driven thereby and which extends downwardly from said power unit to the level of said scraper structure and thence around said circular member, and means for guiding said chain from the downwardly extending reaches thereof to the level of and into encircling engagement with said circular member.

5. Apparatus of the class described comprising a tank having a bottom wall and a side wall, inlet means arranged to conduct a liquid which is to be clarified into the interior of said tank and to discharge said liquid centrally of said tank in a region which is spaced upwardly from the bottom of said tank, outlet means, located adjacent the top of said tank and spaced horizontally from said inlet for conducting clarified liquid from said tank, sediment collecting and discharge means which includes a sediment collecting chamber located in the bottom wall of said tank, a normally submerged, scraper structure, means supporting said scraper structure for rotatable movement within said tank, said scraper structure including a plurality of rigidly interconnected arms which extend outwardly from the center of said tank, a circular structural member which extends peripherally of said scraper structure and which is attached to said interconnected arms, and a plurality of scraper members attached to said arms and movable therewith for effecting movement of sediment along the bottom of said tank and into said sediment chamber as an incident to the rotation of said arms, and means for rotating said scraper structure comprising a normally stationary power unit which embodies a driven sprocket and which is disposed adjacent the top of said tank, an endless chain which engages said sprocket so as to be driven thereby and which extends downwardly from said sprocket to the level of said scraper structure and thence around said circular structural member, and means for guiding said chain from the downwardly extending reaches thereof to and about said circular structural member.

6. Apparatus of the class described comprising a tank having a bottom wall and a side wall, inlet means arranged to conduct a liquid which is to be clarified into the interior of said tank and to discharge said liquid centrally of said tank in a region which is spaced upwardly from the bottom of said tank, outlet means, located adjacent the top of said tank and spaced horizontally from said inlet for conducting clarified liquid from said tank, sediment collecting and discharge means which includes a sediment collecting chamber located in the bottom wall of said tank, a normally submerged, scraper structure, means supporting said scraper structure for rotatable movement within said tank, said scraper structure including a plurality of rigidly interconnected arms which extend outwardly from the center of said tank, a circular structural member which extends peripherally of said scraper structure and which is attached to said interconnected arms, and a plurality of scraper members attached to said arms and movable therewith, means for rotating said scraper structure comprising a normally stationary power unit which embodies a driven sprocket and which is disposed adjacent the top of said tank, an endless chain which engages said sprocket so as to be driven thereby and which extends downwardly from said sprocket to the level of said scraper structure and thence around said circular structural member, means for guiding said chain from the downwardly extending reaches thereof to and about said circular structural member, said chain being of greater length than required for its normal path of movement and being provided with an excess length take-up loop, yieldable means for holding said loop distended so as to maintain the operative portion of said chain in normal engagement with said circular member and said sprocket, and said circular structural member having means for disengageably securing and locking said chain thereto during the operation of said apparatus to prevent relative movement between said circular member and said chain.

7. Apparatus of the class described comprising a tank having a bottom wall and a side wall, inlet means arranged to conduct a liquid which is to be clarified into the interior of said tank and to discharge said liquid centrally of said tank in a region which is spaced upwardly from the bottom of said tank, outlet means, located adjacent the top of said tank and spaced horizontally from said inlet, for conducting clarified liquid from said tank, sediment collecting and discharge means which includes a sediment collecting chamber located in the bottom wall of said tank, a normally submerged, scraper structure which includes a frame, a plurality of downwardly extending scraper members attached to said frame, and a circular structural member mounted on said frame at the periphery thereof, means supporting said scraper structure for rotation within said tank whereby said scraper members will effect movement of sediment along the bottom of said tank and into said sediment collecting chamber, said support means including a plurality of hangers mounted on the inside of said side wall in circumferentially spaced relation to each other and having means for movably engaging said circular frame member, and means for effecting rotation of said scraper structure and the scraper means mounted thereon comprising a normally stationary power unit which embodies a driven sprocket and which is disposed adjacent the top of said tank, an endless chain which engages said sprocket so as to be driven thereby and which extends downwardly from said sprocket to the level of said circular frame member and thence around said circular frame member, and means for guiding said chain from the downwardly extending reaches thereof to and about said circular frame member.

8. Apparatus of the class described comprising a tank having a bottom wall and a side wall, inlet means arranged to conduct a liquid which is to be clarified into the interior of said tank and to discharge said liquid centrally of said tank in a region which is spaced upwardly from the bottom of said tank, outlet means, located adjacent the top of said tank and spaced horizontally from said inlet, for conducting clarified liquid from said tank, sediment collecting and discharge means which includes a sediment collecting chamber located in the bottom wall of said tank, a normally submerged scraper structure which includes a plurality of rigidly interconnected arms which extend outwardly from the center of said tank, a circular structural member which is spaced from the side walls of said tank and which is attached to said interconnected arms at the periphery of said scraper structure, and a plurality of downwardly extending scraper members attached to said arms, means supporting said scraper structure for rotation within said tank whereby said scraper members will effect movement of sediment along the bottom of said tank and into said sediment collecting chamber, said support means including a plurality of hangers mounted on the inside of said side wall in circumferentially spaced relation to each other and roller means mounted on said hangers for movably engaging and supporting said circular frame member and said arms which are attached thereto, and means for effecting rotation of said scraper structure and said scraper members comprising a normally stationary power unit which embodies a driven sprocket and which is disposed adjacent the top of said tank, an endless chain which engages said sprocket so as to be driven thereby and which extends downwardly from said sprocket to the level of said circular structural member and thence around said member, and means for guiding said chain from the downwardly extending reaches thereof to and about said circular frame member.

HAROLD T. JEFFERY.

REFERENCES CITED

The following references are of record in the file of this patent:

UNITED STATES PATENTS

| Number | Name | Date |
|---|---|---|
| 2,078,266 | Morehead | Apr. 27, 1937 |
| 2,086,730 | Miick | July 13, 1937 |
| 1,650,820 | Coe | Nov. 29, 1927 |
| 1,734,967 | Gavett | Nov. 12, 1929 |
| 1,828,794 | Walker | Oct. 27, 1931 |
| 1,972,584 | Easterday | Sept. 4, 1934 |
| 2,052,676 | Tark | Sept. 1, 1936 |
| 2,149,313 | Sayers et al. | Mar. 7, 1939 |
| 1,530,659 | Force | Mar. 24, 1925 |
| 2,067,105 | Stevens et al. | Jan. 5, 1937 |
| 2,003,261 | Lund | May 28, 1935 |
| 2,126,884 | Hardinge | Aug. 16, 1938 |
| 2,226,974 | Hardinge | Dec. 31, 1940 |
| 2,265,046 | Sabin | Dec. 2, 1941 |
| 2,291,836 | Scott | Aug. 4, 1942 |
| 2,295,943 | Finney | Sept. 15, 1942 |
| 2,202,475 | Wileman | May 28, 1940 |
| 2,103,796 | Seip | Dec. 28, 1937 |
| 2,364,022 | Gillard | Nov. 28, 1944 |
| 1,007,954 | Lamb | Nov. 7, 1911 |
| 1,957,185 | Weber et al. | May 1, 1934 |
| 2,101,080 | Lund | Dec. 7, 1937 |
| 2,318,436 | Tark | May 4, 1943 |
| 1,990,458 | Marshall | Feb. 5, 1935 |

FOREIGN PATENTS

| Number | Country | Date |
|---|---|---|
| 370,665 | British | Apr. 14, 1932 |
| 421,479 | British | Dec. 21, 1934 |